Patented Sept. 26, 1922.

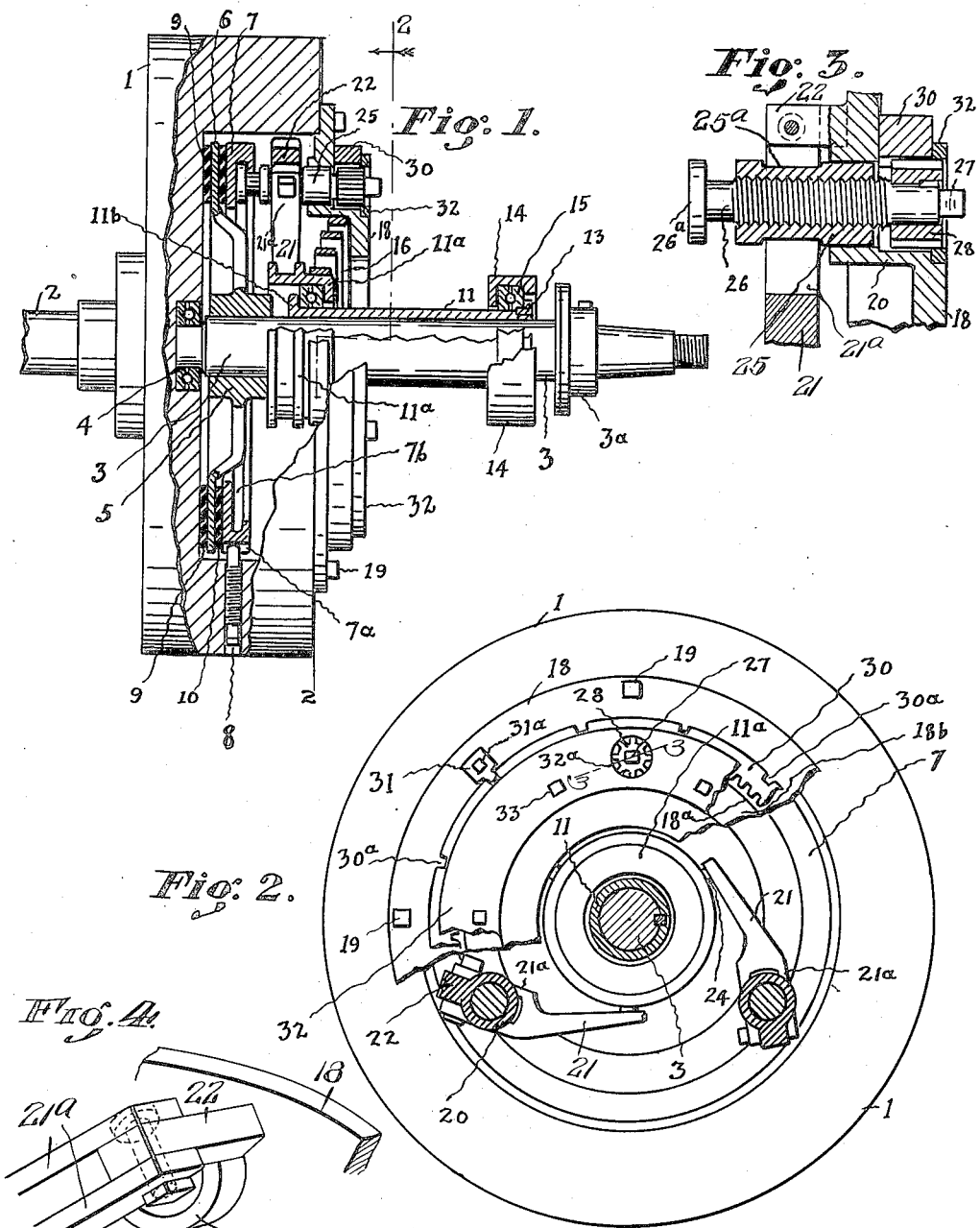

1,429,962

UNITED STATES PATENT OFFICE.

THOMAS MORGAN, OF MUNCIE, INDIANA.

FRICTION CLUTCH.

Application filed December 28, 1918. Serial No. 268,660.

*To all whom it may concern:*

Be it known that I, THOMAS MORGAN, a citizen of the United States, residing at Muncie, in the county of Delaware and State of Indiana, have invented certain new and useful Improvements in Friction Clutches, of which the following is a specification.

This invention relates to improvements in friction clutches.

A clutch of the type to which the present improvements relate, comprises a driving element, a driven element, a casing fixed to the driving element and embracing the driven element, a thrust or clamping ring mounted within and movable longitudinally of the casing, and connections carried by the casing and adapted to retain the thrust ring at frictional engagement with the driven element.

Objects of the present invention are to provide a clutch of this kind which will be dependable in action, durable and not liable to get out of repair; simple in construction and economical of manufacture. Specific purposes are to provide a combination and arrangement of parts whereby a positive and reliable control of the thrust ring is had, and whereby adjustment of the several parts of the device, to compensate for wear, may be easily made by a person of only ordinary skill.

My invention is embodied in the new construction, combination and arrangement of parts shown in the annexed drawings and described in the following specification. The invention is defined in the appended claims.

In the drawings the several parts of the invention are identified by suitable characters of reference applied thereto in the different views; in which,—

Figure 1 is a central longitudinal sectional view of my improved friction clutch, parts thereof being shown in elevation.

Figure 2 is a transverse sectional view taken on the line 2—2 in Figure 1 and as seen in the direction indicated by the arrow; parts only of the casing, and of the adjusting ring and retaining ring, being shown.

Figure 3 is a detail sectional view taken on line 3—3 of Figure 2.

Figure 4 is a detail perspective view of a portion of the cover plate, showing the boss and lug carried thereby, and a portion of one of the pivoted levers carried by the lug.

The mechanism in which this invention is embodied, comprises a driving member, and a driven member, a hubbed disk secured to the driven member, a casing secured to the driving member, a thrust ring mounted to rotate with the driving member but which is movable longitudinally thereof, and connections carried by the casing to normally maintain the thrust ring and friction disk and driving member in frictional engagement, but which is capable of being moved and said frictional engagement thereby released. My improvement consists in the construction, combination and arrangement of parts, as shown, and by which the control of the thrust ring is had positively and reliably, and whereby adjustment of the several parts of the mechanism to compensate for wear may be correctly and easily made.

The usual fly wheel 1 is carried on the motor driving-shaft 2. For the reception of the several parts presently to be described, the fly wheel is recessed as shown in Figure 1. An anti-friction bearing 4 which is seated in the central recess therefor, constitutes a bearing for the end of the driven shaft 3. A power transmitting member whose hub 5 is splined upon the driven shaft 3 has its annular portion 6 of the suitable diameter and thickness shown and is designated as the friction disk.

The thrust ring 7 is supported in the recess of the fly wheel and adjacent to the friction disk. This thrust ring is free to move longitudinally, being held against rotation relatively of the fly wheel by the studs 8 which loosely engage the grooves 7$^a$ of the thrust ring. On the internal rearward side of the peripheral flange of the thrust ring is an annular groove 7$^b$ whose function will be presently referred to. Friction rings 9 and 10 made preferably of fiber are provided; the ring 9 being located between the inner face of the fly wheel and the face of the disk; and the other ring being disposed between the face of the friction disk and the thrust ring 7. It is considered preferable that the friction rings be disposed as described, merely resting between the opposed faces of these members.

A collar 13 which is threaded upon the end of the loose sleeve 11 has engagement with a throw-out-ring 14 by an anti-friction bearing 15. The throw-out-ring 14 does not rotate and is adapted to be moved longitudinally of the shaft by a suitable clutch lever (not shown). When the throw-out-ring is moved toward the left, (viewing the drawing) to throw in the clutch, the collar 11$^a$ is caused to follow the flange 11$^b$ by a spiral spring 16 which is interposed for the purpose, between the inner face of the casing and the adjacent face of the collar 11$^a$. The casing member 18 is fixed to the fly wheel 1 by bolts 19 so that the casing rotates with the fly wheel and with shaft 2. The function of the usual stop-collar 3$^a$ on shaft 3 is to establish contact with the throw-out-ring 14 when it reaches the limit of its stroke; the result being to stop the motion of shaft 3 and the hubbed disk.

That a clutch of this class may function to the best advantage, it is essential that the thrust ring 7 may be held at tight contact with the adjacent friction ring; also, that when the clutch is thrown out, all liability of the thrust ring making contact with the friction ring, should be avoided. Also it is desirable that adjustment may be had, whereby changes in wearing surfaces due to wear, may be compensated.

The aforesaid advantages are accomplished by the mechanism described as follows: Formed inside the casing member 18 are bosses 20. In the bore of each boss is loosely disposed a cross head 25 (see Figure 3) adapted to be actuated by a lever 21. The head portion of the said lever 21 is forked and has pivotal connection on a lug 22 of the casing member 18; it is retained by suitable means. The form of this lever 21 is shown in Figure 2 the free end thereof being terminated at a point for the stud 24 to engage in the groove of the collar 11$^a$. The jaws or sides 21$^a$ of this lever engage in the recesses 25$^a$ of the cross head. This cross head and its head piece 26 constitutes a continuous connecting means between the lever 21 and the thrust ring, and a positive connection with the thrust ring. The head piece being adjustable in the cross head, it is possible to adjust the distance between the thrust ring and the bearing points of the lever. The head piece, as shown in Figure 3 occupies a threaded bore in the cross head. The head 26$^a$ is adapted to engage the groove 7$^b$ of the thrust ring 7. A gear wheel 28 is secured on the shouldered end of the head piece. The angular stud 27 which is formed in the end of the head piece is provided so that a wrench may be used to turn the said head piece, thereby varying its position in the cross head.

In assembling; the cross heads 25 with their connection heads 26$^a$ in engagement with the groove 7$^b$ of the thrust ring 7 and their gear wheels 28, are placed in the bores of the bosses 20. The levers 21 and the spring 16 are then disposed at place, the studs 24 of the free ends of the levers being at engagement with the groove of collar 11$^a$. With the casing member 18 then secured at place, the parts occupy the relative positions as shown in Figure 1 and in Figure 2. The annular rack 30 when at the position as shown in the drawing has its teeth in engagement with the teeth of the gear wheels 28, it being apparent that a shifting of the rack causes a moving of the gear wheels and a consequent change of the distance between the bearing points of the levers and the thrust ring.

To vary the distance between the head 26$^a$ and the cross head 25 a wrench may be applied to the stud 27, and the head piece turned; it being obvious that the rack is moved accordingly and each of the other two head pieces are turned the same distance as that turned by the one to which the wrench is applied.

A locking detent 31 loose on a bolt 31$^a$ that is carried by the casing may be set at engagement with one of the notches 30$^a$ of the said rack. To constitute a closure of the space between the toothed portion of the rack 30 and the ledge 18$^a$ of the casing member, and a means for retaining the rack at position, the ring-plate 32 is provided. Openings 32$^a$ permit this ring-plate to be disposed at seated position against the face 18$^b$ of the casing member and it is secured by bolts 33.

From the foregoing description, it is obvious that the positive control of the position of the thrust or clamping ring, with reference to the friction disks, is accomplished. Idling or vibration longitudinally of the thrust ring is impossible. To maintain the proper relative position of the thrust ring with respect to wear of the several parts, a slight shifting of the position of the rack and a locking of same at its new position is all that is necessary. The application of the wrench for this purpose, being entirely from the outside of the device, this adjustment may easily be made quickly and correctly by a person of the most ordinary skill, or by the driver himself.

By the nature of the construction and arrangement of the several parts described, it is also apparent that a clutch constructed in accordance with my invention, is rugged and durable, and not liable to become deranged as to adjustment or as to functional duty.

Another advantage is that by observation of the device from the outside, the fact as to whether the same is in correct adjustment, may be determined. In practice it is desirable that the distance between the yoke throw out ring 14 and the stop collar 3$^a$ is one-half inch. It is obvious that by the wear of the contacting parts the power of the spring 16 may urge the loose sleeve 11 and its parts, in direction toward the fly wheel,—thus, when it may be observed that there is an increase of the distance between the yoke throw-out collar and the stop ring 3ª, it is apparent that the wear at the contacting parts has so progressed that an adjustment should be made.

Being enabled to know that such adjustment should be made, at a time before the clutch may have manifested wear, by its failure, or by its becoming out of order, is of decided importance. Another obvious advantage is that there is at all times assured the release of the thrust ring at a moment before the contact of the yoke throw out ring 14 and the stop ring 3ª occurs; thereby obviating any possibility of premature gripping by the connecting parts.

Another feature of the invention is that the total wearing out of the fiber rings cannot result in the derangement of the clutch.
This advantage is gained by the limiting of the distance between the inner face of the gear wheel 28—and the end of the cross head 25. It will be seen that after the gear wheel may have been moved through sufficient revolution to bring it into contact with the end of the cross head 25, all of the adjusting distance will have been availed of. It being apparent that the wearing out of the friction ring has progressed to an abnormal extent, it is time to refit the clutch with new friction rings.

The invention as shown in this specification is shown in the embodiment deemed preferable in clutches of the smaller type;
it being understood that the invention may be embodied in clutch mechanisms of different sizes and of varying requirements. It is also understood that minor changes may be made in the construction and the details of arrangement without departing from the spirit of my invention or sacrificing any of its advantages.

What I claim as my invention, and desire to secure by Letters Patent, is:—
1. In a friction clutch comprising a driving element, a driven element, a casing fixed to the driving element, a thrust ring mounted within and movable longitudinally of the casing, shifting means within the casing to move the thrust ring into and out of contact with the driven element, the combination of connector members carried by the casing and capable of being moved adjustably therein, and having free retaining engagement with the thrust ring, an adjusting member carried by the casing and having connection with the connector members so that when it is shifted all of the connector members are moved, and a device to hold the adjusting member at set position.

2. A friction clutch, comprising a driving element, a driven element, a casing fixed to the driving element, a thrust ring mounted within and movable longitudinally of the casing and having a peripheral inturned flange, levers fulcrumed inside the casing, connectors retained adjustably in said casing and carried loosely on said levers and having their heads to engage in the flange of the thrust ring, a throw-out sleeve loose on the driven member, a grooved pull collar carried by the sleeve but loose rotatably thereon the power arms of said levers being in loose engagement with the groove of said pull collar, a spring between the casing and the pull collar, and a throw-out ring loose on the throw-out sleeve.

3. A friction clutch, comprising a driving element, a driven element, a casing fixed to the driving element, a thrust ring mounted within and movable longitudinally of the casing and having an inturned flange, levers fulcrumed inside the casing, connectors retained adjustably in said casing and carried loosely on said levers and having their heads to engage in the flange of the thrust ring, connections carried on the driven member to actuate said levers, an adjuster member carried by the casing and in such engagement with the connectors that when it is shifted all of the connectors are moved, and a device to hold the adjuster member at set position.

4. In a friction clutch, the combination with a driving element, a driven element, a casing fixed to the driving element, a throw out sleeve, a pull collar thereon, lever connections operable by the pull collar to move the thrust ring, of a thrust ring having a peripheral inturned flange, cross heads mounted loose in the casing longitudinally thereof, connector head pieces screwed through said cross heads and having flanged heads at engagement with the thrust ring flange, a gear wheel secured on the end of each head piece, a movable annular rack mounted on the casing to mesh with the said gear wheels, and a device to hold the said rack at set position.
5. In a friction clutch of the kind described, in combination with levers operable to move the thrust ring, of cross heads for said levers and which are loose longitudinally in the casing, a thrust-ring connector head-piece screwed longitudinally through each cross head, and means on the casing having engagement with each head-piece to retain them at adjusted positions, but which when moved shifts the head-pieces on their axes.

6. In a friction clutch of the kind described, in combination with levers operable to move the thrust ring, of cross heads for said levers and which are loose longitudinally in the casing, a connector head-piece for the thrust ring and that is screwed longitudinally through each cross head, there being an angular wrench hold stud formed on the outer end of each head-piece, a gear wheel secured to each head-piece, an annular rack mounted loose on the casing and which meshes with the gear wheels, and a device to hold the rack at adjusted position.

In testimony whereof I affix my signature in the presence of two witnesses.

THOMAS MORGAN.

Witnesses:
 THOMAS E. SKILLMAN,
 WM. J. DOUGLAS.